US010618474B2

(12) United States Patent
Denny

(10) Patent No.: US 10,618,474 B2
(45) Date of Patent: Apr. 14, 2020

(54) SHARKFIN RF AND CAMERA INTEGRATION

(71) Applicant: Connaught Electronics Ltd., Tuam, County Galway (IE)

(72) Inventor: Patrick Eoghan Denny, Roscam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 237 days.

(21) Appl. No.: 14/939,808

(22) Filed: Nov. 12, 2015

(65) Prior Publication Data

US 2017/0136959 A1    May 18, 2017

(51) Int. Cl.
| | |
|---|---|
| *B60R 11/04* | (2006.01) |
| *B60R 11/02* | (2006.01) |
| *G07C 5/08* | (2006.01) |
| *H04N 5/225* | (2006.01) |
| *H04N 7/18* | (2006.01) |
| *H01Q 21/28* | (2006.01) |
| *H01Q 1/32* | (2006.01) |

(52) U.S. Cl.
CPC .......... *B60R 11/0205* (2013.01); *B60R 11/04* (2013.01); *G07C 5/0866* (2013.01); *H04N 5/2252* (2013.01); *H04N 5/2253* (2013.01); *H04N 7/183* (2013.01); *B60R 2011/0294* (2013.01); *H01Q 1/3275* (2013.01); *H01Q 21/28* (2013.01)

(58) Field of Classification Search
CPC .............. B60R 11/0205; B60R 11/04; B60R 2011/0294; G07C 5/0866; H04N 5/2252; H04N 5/2253; H04N 7/183; H01Q 1/3275; H01Q 21/28
See application file for complete search history.

(56) References Cited

U.S. PATENT DOCUMENTS

| | | | |
|---|---|---|---|
| 2006/0139454 A1* | 6/2006 | Trapani ................ | B60R 25/102 348/148 |
| 2009/0189446 A1* | 7/2009 | Lindsey ................ | H02J 7/1415 307/24 |

(Continued)

FOREIGN PATENT DOCUMENTS

| | | | | |
|---|---|---|---|---|
| CN | 104979631 A | 10/2015 | | |
| DE | 102009012615 A1 * | 9/2010 | ........... | H01Q 1/3275 |

(Continued)

OTHER PUBLICATIONS

Notification of Transmittal of the International Search Report and the Written Opinion of the International Searching Authority, or the Declaration, and the International Search Report issued in corresponding International Application No. PCT/EP2016/077262, dated Mar. 3, 2017 (10 pages).

*Primary Examiner* — William C Vaughn, Jr.
*Assistant Examiner* — Joseph Daniel A Towe
(74) *Attorney, Agent, or Firm* — Osha Liang LLP

(57) ABSTRACT

A communication assembly may include a first antenna. The communication assembly may further include a housing that houses the first antenna and an electronics enclosure. The housing may include a bottom that may be disposed on a fuselage of a vehicle. The electronics enclosure may include a radio frequency module and a camera module. The electronics enclosure may transmit heat to the fuselage of the vehicle by the bottom of the housing.

14 Claims, 14 Drawing Sheets

(56) References Cited

U.S. PATENT DOCUMENTS

| | | | |
|---|---|---|---|
| 2009/0219939 A1* | 9/2009 | Isosaari | H04L 29/06027 |
| | | | 370/400 |
| 2010/0136936 A1 | 6/2010 | Jiang | |
| 2012/0218152 A1 | 8/2012 | Leelaratne | |
| 2014/0043519 A1* | 2/2014 | Azuma | G03B 3/10 |
| | | | 348/345 |
| 2014/0125549 A1 | 5/2014 | Kaneko | |
| 2014/0357311 A1* | 12/2014 | Suzuki | H04W 52/04 |
| | | | 455/522 |
| 2015/0229020 A1* | 8/2015 | Sugimoto | H01Q 1/3275 |
| | | | 343/702 |
| 2015/0365569 A1* | 12/2015 | Mai | H04N 5/2252 |
| | | | 348/373 |
| 2016/0352533 A1* | 12/2016 | Talty | H04L 12/4015 |
| 2016/0381571 A1* | 12/2016 | Koravadi | H04B 7/0617 |
| | | | 348/148 |

FOREIGN PATENT DOCUMENTS

| | | | | |
|---|---|---|---|---|
| DE | 102009012615 A1 * | 9/2010 | ........... | H01Q 1/3275 |
| KR | 100909368 B1 | 7/2009 | | |
| WO | 2011/051454 A1 | 5/2011 | | |
| WO | 2013090783 A1 | 6/2013 | | |
| WO | WO 2013090783 A1 * | 6/2013 | ........... | H01Q 1/3275 |
| WO | WO-2013090783 A1 * | 6/2013 | ........... | H01Q 9/0407 |
| WO | 2015/003384 A1 | 1/2015 | | |
| WO | 2015164596 A2 | 10/2015 | | |

* cited by examiner

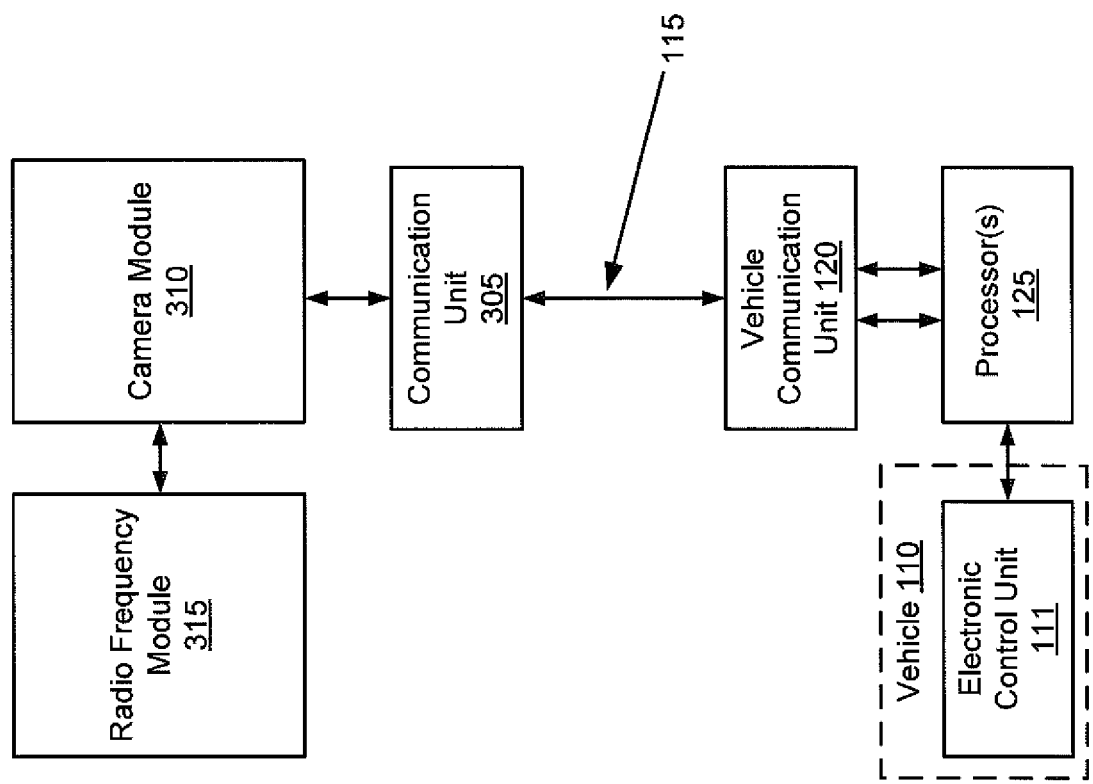

SHARKFIN RF AND CAMERA INTEGRATION

BACKGROUND

A vehicle may need to send and receive data by multiple wireless links. For example, a vehicle may need to receive global positioning signals from a satellite to provide a user, e.g., driver of a vehicle, with navigation information. Further, a vehicle may need to receive broadcast channels from a radio station to provide a user with access to radio stations.

Additionally, a vehicle may need to provide a user of the vehicle with situational awareness by video feeds. These video feeds may be recorded by cameras and displayed on a cabin display of the vehicle.

SUMMARY

In one aspect, a communication assembly in accordance with one or more embodiments of the invention may include a first antenna. The communication assembly may include a housing that houses the first antenna and an electronics enclosure. The housing may include a bottom that may be disposed on a fuselage of a vehicle. The electronics enclosure may include a radio frequency module and a camera module. The electronics enclosure that transmits heat to the fuselage of the vehicle by the bottom of the housing.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 7C shows a communication diagram in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to a communication assembly. The communication assembly may be configured to be placed on a fuselage of a vehicle. For example, the communication assembly may be placed on a roof of a vehicle such as a car.

The communication assembly may include a radio frequency (RF) module, such as, for example, a transceiver, and a camera module. Each of the aforementioned components may be enclosed in an electronics enclosure of the communication assembly. In one or more embodiments of the invention, the radio frequency module and camera module may be integrated together as a single electronic device. In other embodiments, the radio frequency module and the camera module may be separate electronic devices housed in a single electronics enclosure. Housing the radio frequency module and the camera module in an electronics enclosure may improve the performance of the communication assembly by decreasing electromagnetic interference and improving heat dissipation.

The radio frequency module may enable a vehicle on which the communication assembly is disposed to send and receive data wirelessly. The radio frequency module may receive data from an electronic control system of a vehicle and transmit the data wirelessly via one or more antennas of the communication assembly. Similarly, data may be wirelessly received by the radio frequency module by the one or more antennas and the radio frequency module may transmit the received data to the electronic control system of the vehicle.

The camera module may include a camera that enables a video feed to be displayed on a video display of a vehicle on which the communication assembly is disposed. In one or more embodiments of the invention, the camera may generate a video feed of an exterior of the vehicle. For example, if the communication module is placed on a roof of a vehicle, the camera module may generate a video feed of an exterior scene in front of, to the rear of, or to one or both sides of the vehicle. In one or more embodiments of the invention, the scene captured by the camera may be a rearward view of the vehicle. Those skilled in the art will appreciate that depending on the placement of the camera module, the camera may capture any combination of the aforementioned exterior scenes surrounding the vehicle.

Figure 1A:
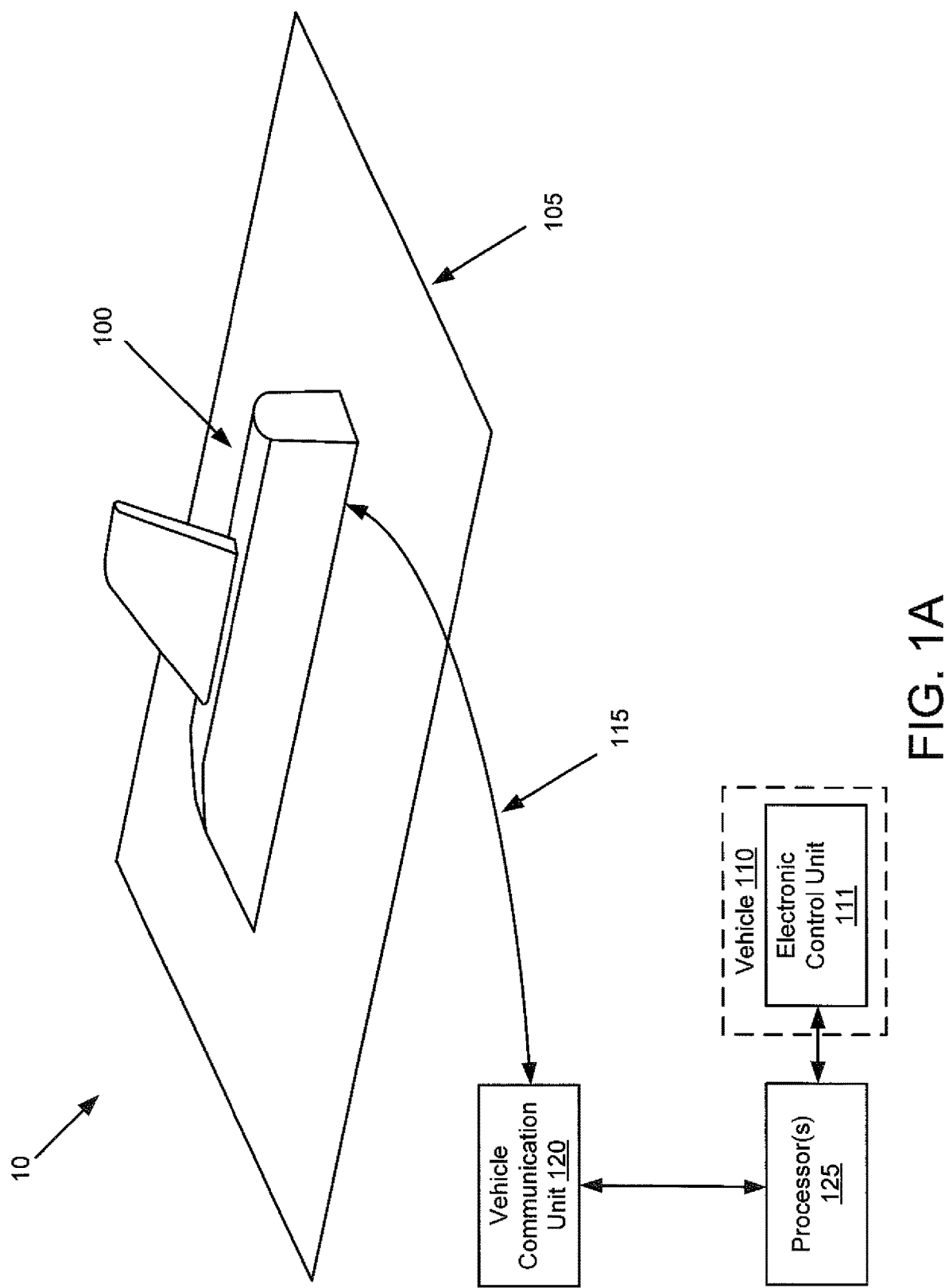
FIG. 1A shows a communication system in accordance with one or more embodiments of the invention.

FIG. 1A shows a communication system (10) in accordance with one or more embodiments of the invention. The communication system (10) may enable a vehicle (110) to send and/or receive data wirelessly and provide a user, e.g., driver, of a vehicle with situational awareness of a surrounding of the vehicle. For example, the communication system (10) may provide a video feed of an exterior scene surrounding a vehicle (110) that may be displayed to a user/driver of the vehicle (110).

When the communication system (10) is operably connected to a vehicle (110), the communication system (10) may be controlled by an electronic control unit (ECU) (111) of the vehicle (110). For example, the ECU (111) may send commands to the communication system (10) to turn components of the communication system (10) on or off, adjust control parameters of components of the communication system (10), or otherwise adjust the operation of the communication system (10). The ECU may include, in one or more embodiments, at least one processor and associated memory.

Figure 7B:
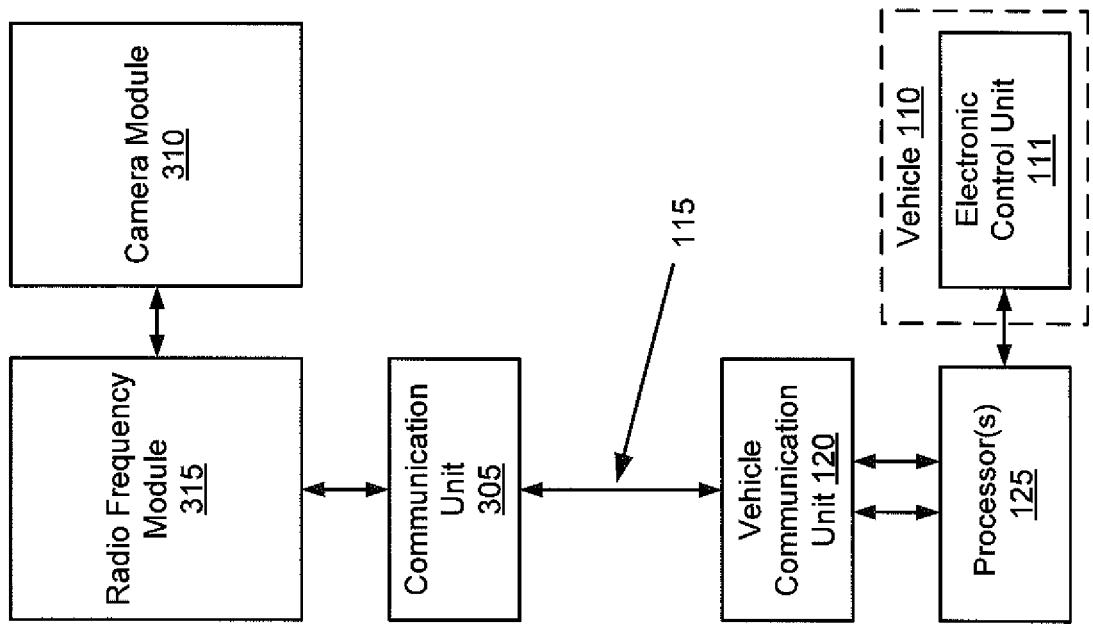
FIG. 7B shows a communication diagram in accordance with one or more embodiments of the invention.
Figure 7A:
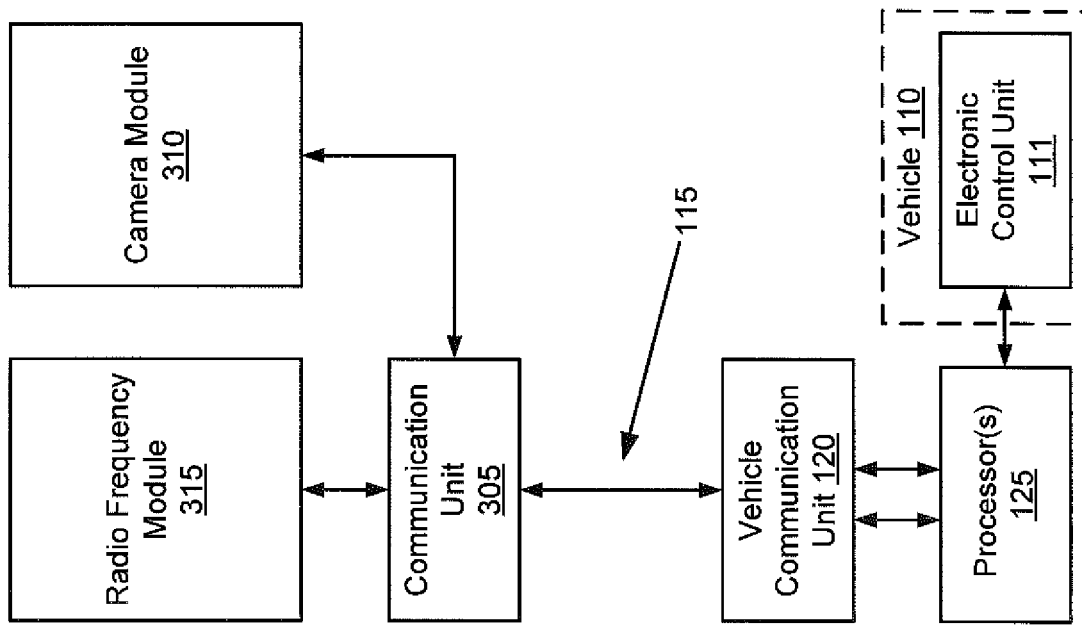
FIG. 7A shows a communication diagram in accordance with one or more embodiments of the invention.

The communication system (10) may include a communication assembly (100), a vehicle communication unit (120), and one or more processors (125). Each of these components is described below. Communications between each of the aforementioned components is also shown in FIGS. 7A-7B.

The communication assembly (100) may be a physical device configured to be disposed on a fuselage (105) of a vehicle (110). The vehicle (110) may be, for example, an automobile, truck, boat, plane, or other mobile machine. More than one communication assembly (100) may be disposed on a vehicle without departing from the invention.

In one or more embodiments of the invention, the communication assembly (100) may have a shape of a sharkfin. Shaping the communication assembly (100) as a sharkfin may decrease wind resistance of the vehicle (100) caused by the communication assembly (100) when compared to other shapes such as a cube while providing sufficient height to house electronic elements such as antennas.

Figure 1B:
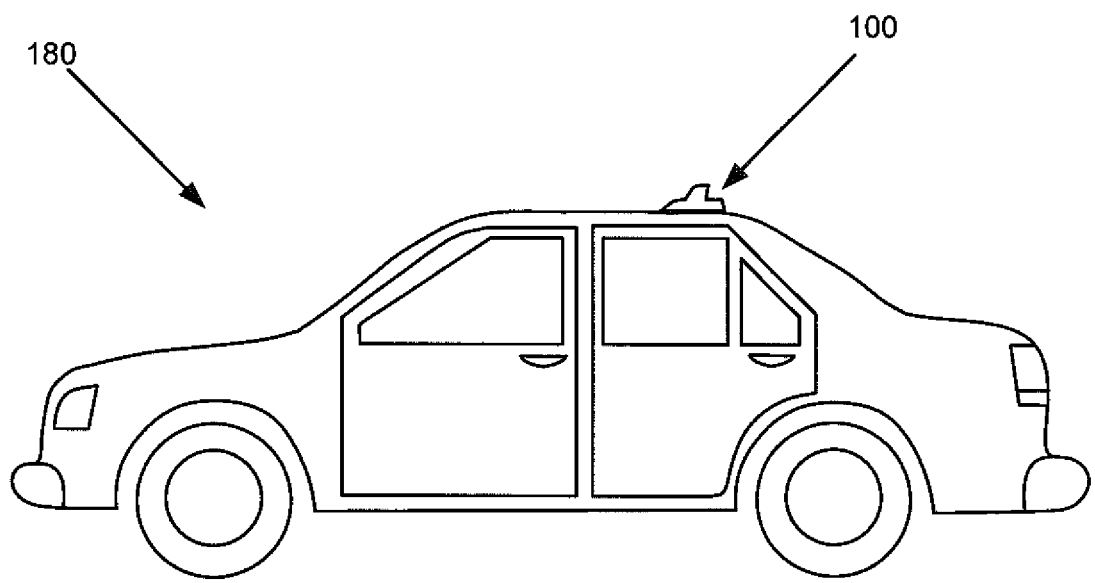
FIG. 1B shows a side view diagram of a communication assembly disposed on a vehicle in accordance with one or more embodiments of the invention.
Figure 1C:
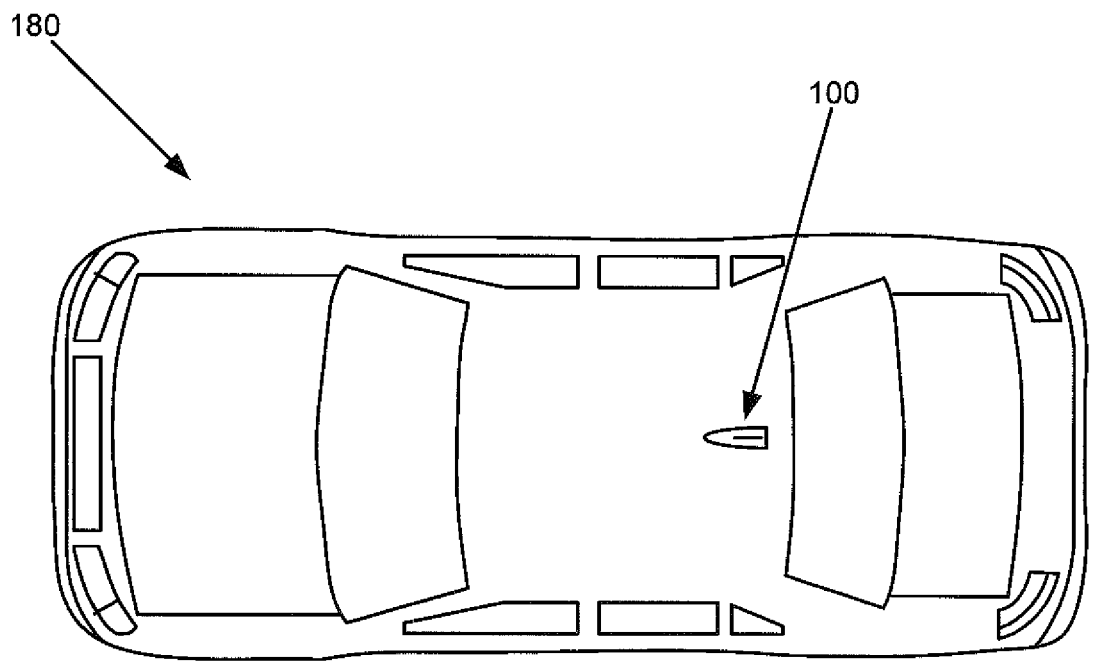
FIG. 1C shows a top view diagram of a communication assembly disposed on a vehicle in accordance with one or more embodiments of the invention.
Figure 1D:
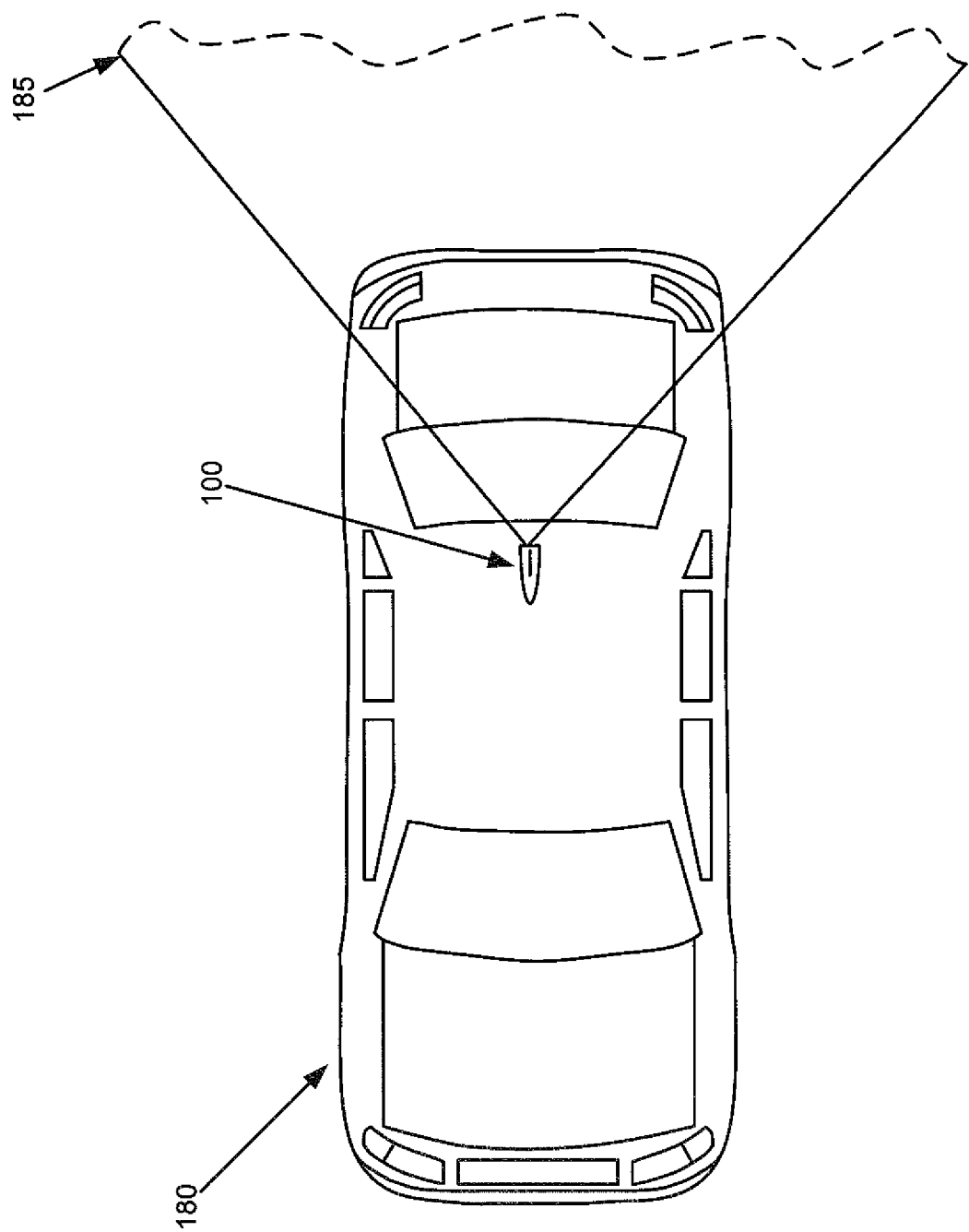
FIG. 1D shows a top view diagram of a communication assembly disposed on a vehicle and a scene in accordance with one or more embodiments of the invention.

A communication assembly (100) having the shape of a sharkfin may be placed on a roof of a vehicle as shown in FIGS. 1B and 1C. FIGS. 1B and 1C show a side view diagram of a communication assembly (100) disposed on a vehicle (180) and a top view diagram of a communication assembly (100) disposed on a vehicle (180), respectively. When disposed on a roof of a vehicle, a camera of the communication assembly (100) may be configured to capture a 130° rearview, a 130° sideview, a 130° front view, or any combination of the aforementioned views. In one or more embodiments of the invention, the view angle may be 190° in each of the aforementioned views. For example, FIG. 1D shows a diagram of an example of a communication assembly (100) disposed on a roof of a vehicle (180) including a camera configured to capture a 120° rear view (185). The camera may capture other view angles without departing from the invention.

In one or more embodiments of the invention, multiple communication assemblies (100) may be disposed on a fuselage of a vehicle. Each of the communication assemblies (100) may include a camera that generates a view. Due to the placement of each communication assembly (100) and the orientation and type of the camera of each communication assembly (100), each communication assembly may provide a different view. Each of the views provided by each of the communication assemblies (100) may be integrated to form a composite view. In one or more embodiments of the invention, the composite view may include a larger view any than any of the views incorporated into the larger view. In one or more embodiments of the invention, the composite view may include a higher resolution view any than any of the views incorporated into the larger view. In one or more embodiments of the invention, the composite view may include a separate area that highlights an important subview related to a vehicle maneuver and a general area that shows an external view from the vehicle. In one or more embodiments of the invention, the composite view may be a zoomed view of a scene exterior to the vehicle that is set on the basis of a sensor measurement by the vehicle. In one or more embodiments of the invention, the composite view may include a view that would otherwise be occluded from the view of the driver by, for example, the roof or a support structure.

Returning to FIG. 1A, in one or more embodiments of the invention, the communication assembly (100) may have a shape that conforms to the contours of a vehicle. Shaping the communication assembly (100) to conform to the contours of a vehicle may decrease wind resistance of the vehicle caused by the communication assembly (100) when compared to other shapes that do not conform to the contours of the vehicle.

Figure 1E:
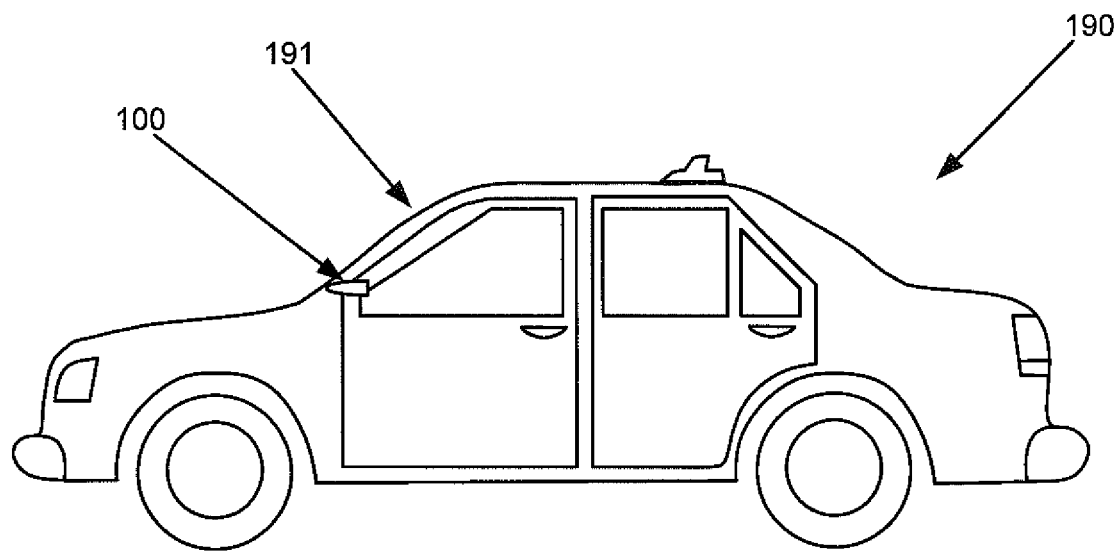
FIG. 1E shows a side view diagram of communication assemblies disposed on a vehicle in accordance with one or more embodiments of the invention.
Figure 1F:
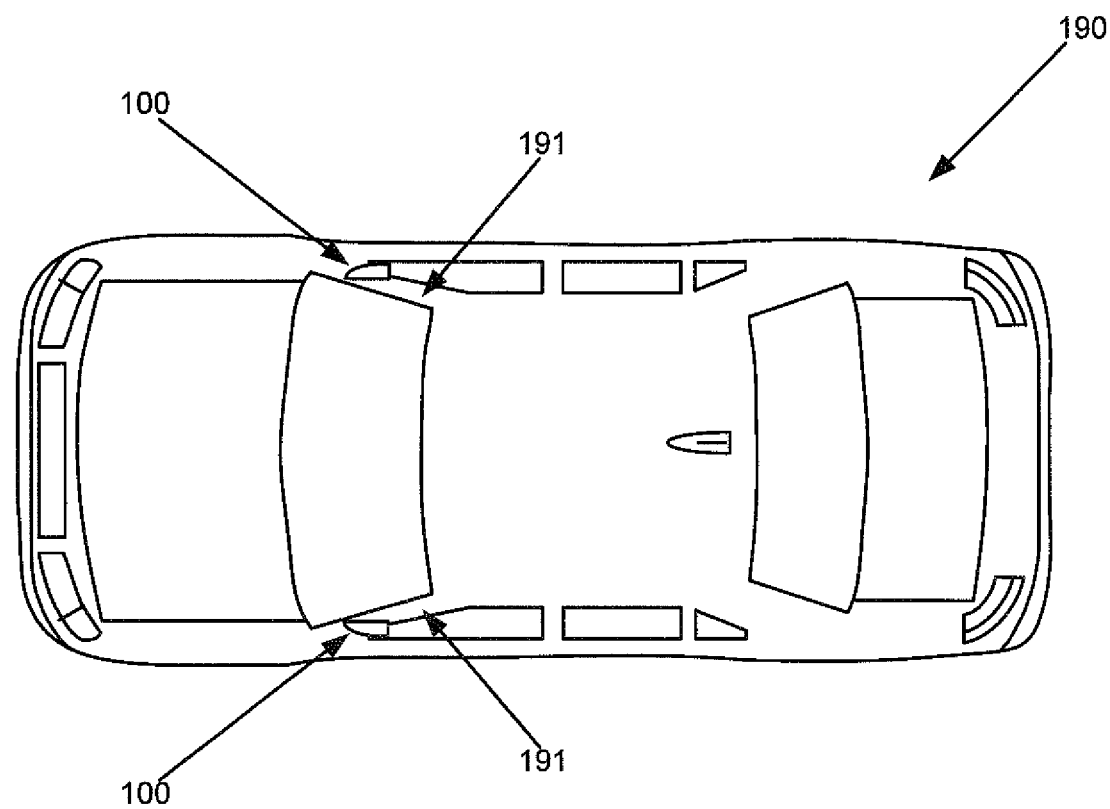
FIG. 1F shows a top view diagram of communication assemblies disposed on a vehicle in accordance with one or more embodiments of the invention.
Figure 1G:
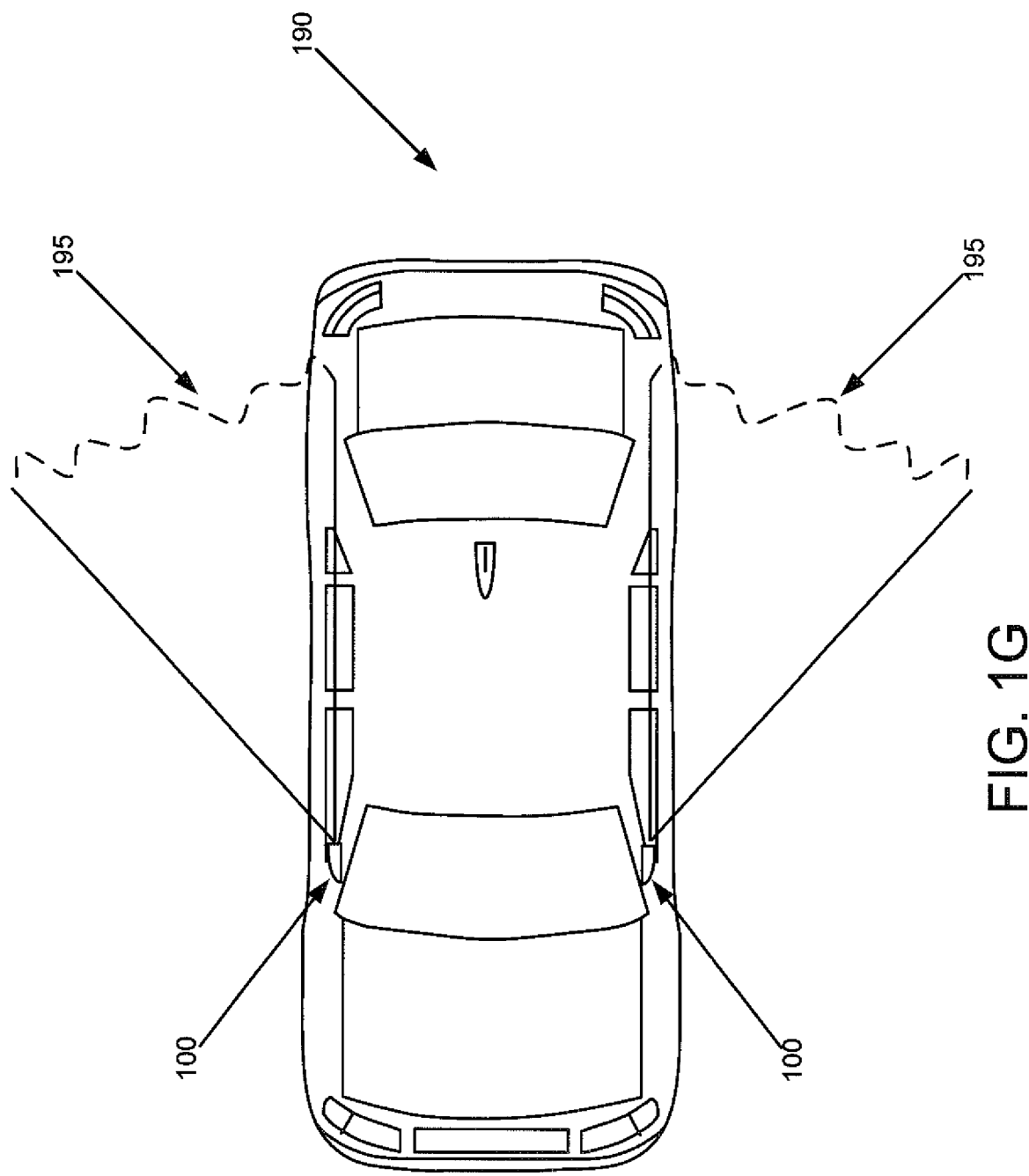
FIG. 1G shows a top view diagram of a communication assembly disposed on a vehicle and a scene in accordance with one or more embodiments of the invention.

A communication assembly (100) having a shape that conforms to the contours of a vehicle may be placed on a structural member of a vehicle as shown in FIGS. 1E and 1F. FIGS. 1E and 1F show a side view diagram of a communication assembly (100) disposed on a structural member (191) of a vehicle (190) and a top view diagram of a communication assembly (100) disposed on a structural member (191) of a vehicle (190), respectively. When disposed on a structural member of a vehicle, a camera of the communication assembly (100) may be configured to capture a 60° rearward perspective view. For example, FIG. 1G shows a diagram of an example of two communication assemblies (100), each assembling being disposed on a different structural member (191) of a vehicle (190). Each communication assembly includes a camera configured to capture a 60° rearward perspective view (195). The camera may capture other view angles without departing from the invention. Each of the communication assemblies (100) shown in FIGS. 1E-1G may be disposed on other portions of a vehicle, including interior regions of a vehicle, without departing from the invention. For example, a communication assembly may be disposed on an interior side of a windshield of a vehicle and may be configured to capture a scene that could be provided by a rearview mirror. In one or more embodiments of the invention, the structural member may be a front roof support of a vehicle.

One of ordinary skill in the art will appreciate that numerous variations of embodiments of the invention are possible including varying the number of communication assemblies, the view provided by each communication assembly, and the location of each communication assembly without departing from the invention. Additionally, the shape of the communication assembly (100) may take forms other than those shown in FIGS. 1A-1G without departing from the scope of the invention. Thus, while FIGS. 2-6 illustrate embodiments of the invention having a shape of a sharkfin, the invention is not to be limited to that shape alone.

Returning to FIG. 1A, the communication assembly (100) may include electronic components for sending and receiving data wirelessly and/or generating image data or a video of a scene around the vehicle. The electronic components will be described in greater detail in FIGS. 2-9.

The communication system (10) may include one or more processors (125). The processors (125) may be physical devices such as circuits. The processors (125) may be operably connected to the electronic control system (111) of the vehicle (110). In one or more embodiments of the invention, the processors (125) may be digital signal processors, application specific integrated circuits, and/or other monolithic hardware. In one or more embodiments of the invention, the processors (125) may be general purpose central processing units executing instructions stored on a non-transitory storage that cause the general purpose central processing units to process the data and/or video feeds generated by the communication assembly (100). The processors (125) are described in greater detail with respect to FIGS. 7A-7C.

In one or more embodiments of the invention, the processors (125) are located at a different location than the communication assembly (100). For example, the processors (125) may be located in an interior of the vehicle (110) while the communication assembly (100) is located on the fuselage (105) of the vehicle.

The processors (125) may communicate with the communication assembly (100) by a vehicle communication unit (120) operably connected to the communication assembly (100) by a communication link (115). The communication link (115) may be a wired or wireless connection that enables the exchange of data between the communication assembly (110) and the vehicle communication unit (120). The communication link (115) may be a network connection and data sent via the communication link (115) may be forwarded by multiple devices before reaching a destination without departing from the invention.

The vehicle communication unit (120) may be an analog or a digital communications processor. The vehicle communication unit (120) may be configured to perform the functions described below and shown in FIGS. 8-9.

In one or more embodiments of the invention, the vehicle communication unit (120) may be a point-to-point communication processor such as a low-voltage differential signaling serializer that sends and receives data by the communication link (115). For example, the vehicle communication unit (120) may receive data from the processor(s) (125). The vehicle communication unit (120) may serialize the data received from the processor(s) (125) and send the data to the communication assembly (100) by the communication link (115). Similarly, the vehicle communication unit (120) may receive data in a serial format from the communication assembly (100) by the communication link (115). The vehicle communication unit (120) may parallelize the received data and send it to the processor(s) (125).

In one or more embodiments of the invention, the vehicle communication unit (120) may be a network processor or a network adapter that sends and receives packets by the communication link (115). For example, the vehicle communication unit (120) may receive data from the processor(s) (125) and generates packets based on the received data. The vehicle communication unit (120) may send the packets to the communication assembly (100) by the communication link (115). Similarly, the vehicle communication unit (120) may receive packets from the communication assembly (100) by the communication link (1150). The vehicle communication unit (120) may extract data from the received packets and send it to the processor(s) (125).

Figure 2:
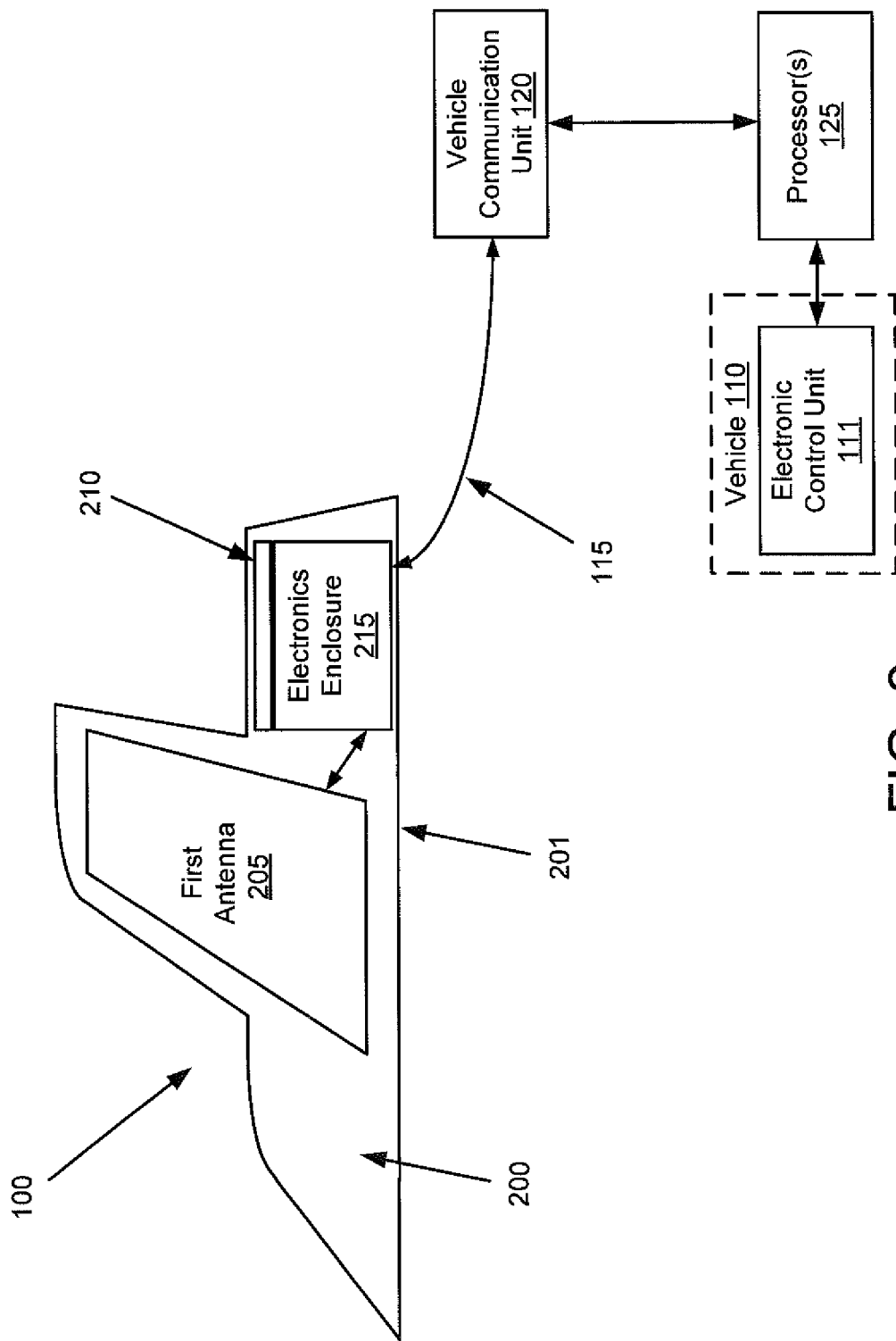
FIG. 2 shows a schematic diagram of a communication system in accordance with one or more embodiments of the invention.

Returning to the communication assembly (100), FIG. 2 shows a schematic diagram of a communication assembly (100) in accordance with one or more embodiments of the invention. The communications assembly (100) may include a housing (200), a first antenna (205), a second antenna (210), and an electronics enclosure (215). Each of these components is described below.

The housing (200) may be a physical structure that houses the first antenna (205), second antenna (210), and electronics enclosure (215). The housing (200) may be at least partially hollow to accommodate the electronics enclosure and antennas. The exterior shape of the housing (200) may be in the form of a sharkfin to minimize air resistance caused by the housing (200). For example, as seen from FIG. 2, the sharkfin shape may limit drag generation by the housing (200) when air passes from left to right. One of ordinary skill in the art will appreciate that the housing (200) may have a different shape without departing from the invention.

The exterior of the housing (200) may have a bottom (201) configured to be disposed on the fuselage of a vehicle. The bottom (201) may be conformal to the fuselage of the vehicle to maximize the contact area of the bottom (201) and the fuselage of the vehicle. The bottom (201) may transmit heat to the fuselage of the vehicle which may improve the performance of electronic devices disposed within the housing.

In one or more embodiments of the invention, the bottom (201) of the housing (200) may be thermally conducting and may transmit heat to the fuselage of a vehicle. The bottom (201) may be a metal such as aluminum.

In one or more embodiments of the invention, the bottom (201) of the housing (200) may be a polymer impregnated with thermally conductive filament to transmit heat to the fuselage of the vehicle.

In one or more embodiments of the invention, the bottom (201) of the housing (200) may be a dielectric material. The bottom (201) may include heat transmitting structures such as heat pipes that traverse from the inside of the housing (200) through the bottom (201). The heat transmitting structures may directly attach to one or more components within the housing and the fuselage of a vehicle on which the housing (200) is disposed to transmit heat from components within the housing (200) to the fuselage of the vehicle.

The rest of the housing (200), other than the bottom (201), may be made of a dielectric material that enables wireless communications to be sent and received by the first antenna (205) and/or second antenna (210). For example, the rest of the housing (200) may be made of a plastic such as acrylonitrile butadiene styrene, polypropylene, polyethylene, polycarbonate, polyvinyl chloride, polystyrene, other polymethylmethacrylate. One of ordinary skill in the art will appreciate that other plastics may be used to form the rest of the housing (200) without departing from the invention.

To support wireless communications, a first antenna (205) and second antenna (210) may be disposed within the housing (200). The antennas may be operably connected to electronics contained in the electronics enclosure (215). Electronics contained in the electronics enclosure (215) may apply voltages to the first antenna (200) and/or second antenna (210).

The first antenna (205) may be a physical device configured to radiate electromagnetic radiation in response to an applied voltage having a first frequency. The first antenna may be a monopole-type antenna including a printed circuit board having at least one conducting patch. The printed circuit board may be orthogonal to the bottom (201) of the housing (200). In one or more embodiments of the invention, the first antenna may use the bottom (201) of the housing as a ground plane. In one or more embodiments of the invention, the first antenna may utilize the fuselage of a vehicle as a ground plane. The size and shape of the at least one conducting patch may be proportional to a wavelength associated with the first frequency of the applied voltage. In response to the applied voltage, the first antenna (205) may radiate vertically polarized radiation due to the first antenna (205) being a monopole-type antenna. For example, with respect to FIG. 2, the electromagnetic radiation radiated by the first antenna may be polarized perpendicularly to the bottom (201) of the housing (200).

The second antenna (210) may be a physical device configured to radiate electromagnetic radiation in response to an applied voltage having a second frequency. The second antenna may be a planar-type antenna including a printed circuit board having at least one conducting patch. The second antenna may be, for example, a patch antenna or a planar inverted-F antenna. The second antenna may be disposed on the electronics enclosure. In one or more embodiments of the invention, the second antenna may use the electronics enclosure as a ground plane. The size and shape of the at least one conducting patch may be proportional to a wavelength associated with the second frequency of the applied voltage. In response to the applied voltage, the second antenna may radiate horizontally polarized radiation due to the second antenna being a planar-type antenna. For example, with respect to FIG. 2, the electromagnetic radiation radiated by the first antenna may be polarized parallel to the bottom (201) of the housing (200).

While the first antenna (205) and second antenna (210) have been described as metallic structures, one of ordinary skill in the art will appreciate that an antenna structure may include and/or be comprised of non-metallic materials. An antenna may include semiconducting or insulating materials without departing from the invention. The non-metallic materials perform different functions than metallic materials such as, for example, absorbing radiation but also may perform the same function as metallic materials such as, for example, transmitting, directing, and/or radiating electromagnetic radiation without departing from the invention.

Figure 3:
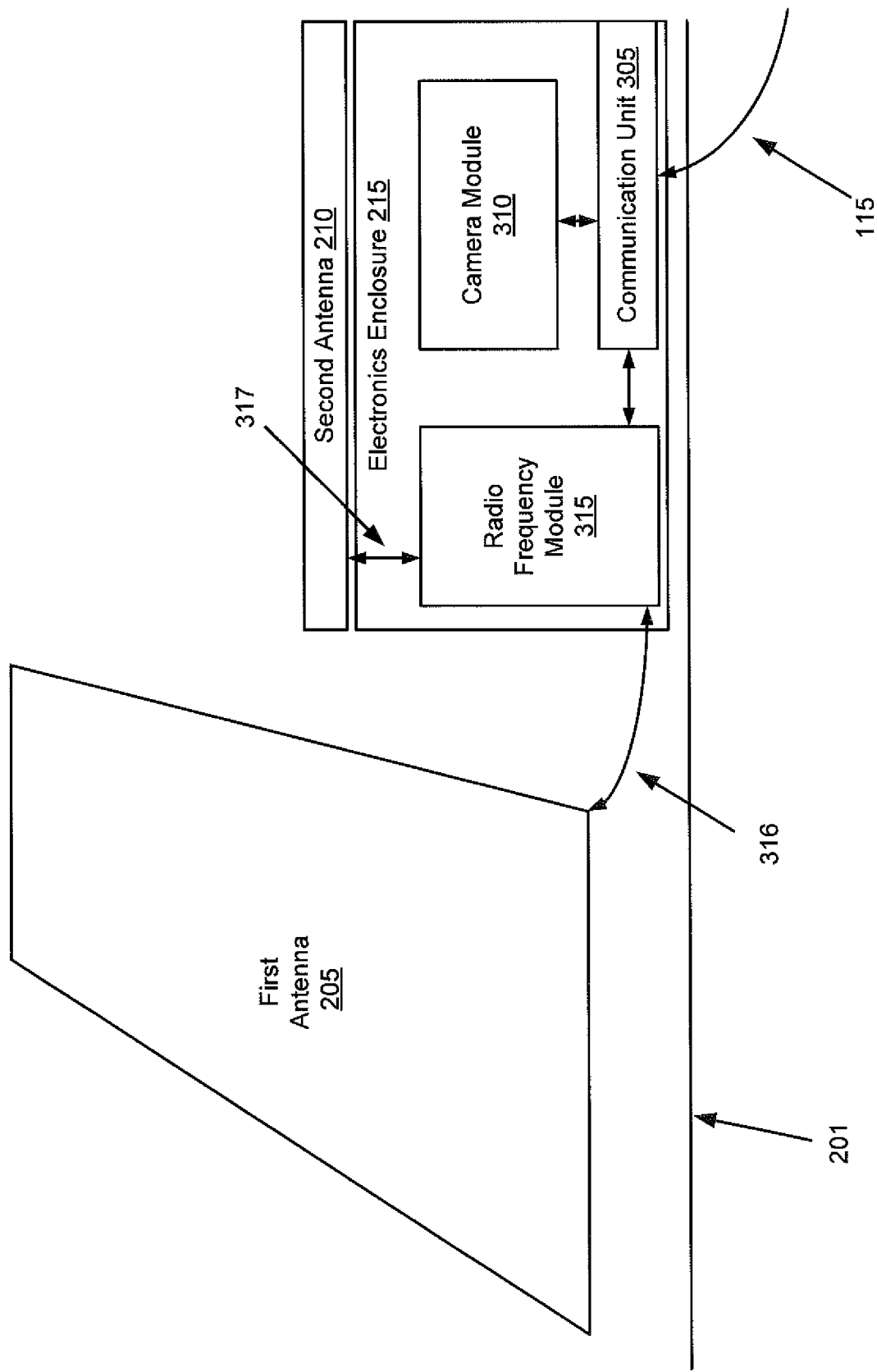
FIG. 3 shows a schematic diagram of a communication system in accordance with one or more embodiments of the invention.

The electronics enclosure (215) may be a metallic structure configured to house electronic devices. FIG. 3 shows an electronics enclosure (215) in accordance with one or more embodiments of the invention. As discussed above, the electronic enclosure (215) may house electronic devices. By housing multiple electronic devices in a single electronics enclosure (215), redundant components such as power supplies and communication interfaces may be eliminated. Eliminating these redundant components may decrease the cost of the communication system (10, FIG. 1A) when compared to systems that house electronic components in multiple enclosures. Further, by eliminating multiple communication interfaces, wiring between electronic components may be reduced. Additionally, integrating certain types of electronic components together provide unexpected, synergistic benefits that will be describe below. In one or more embodiments, the electronic devices housed in the electronics enclosure (215) may include a communication unit (305), camera module (310), and a radio frequency module (315). Each of these components is described below.

The communication unit (305) may be an analog or a digital communications processor and may be operably connected to the camera module (310), the radio frequency module (315), and the vehicle communication processor (120, FIG. 1A). The communication unit (305) may be configured to perform the functions described below and shown in FIG. 8.

In one or more embodiments of the invention, the communication unit (305) may be a point-to-point communication processor such as a low-voltage differential signaling serializer that sends and receives data by the communication link (115). For example, the communication unit (305) may receive data from the radio frequency module (315) and/or the camera module (310). The communication unit (305) may serialize the data and send the data to the vehicle communication unit (120, FIG. 1A) by the communication link (115). Similarly, the communication unit (120, FIG. 1A) may receive data in a serial format from the vehicle communication unit (120, FIG. 1A) by the communication link (115). The communication unit (315) may parallelize the received data and send it to the radio frequency module (315) and/or the camera module (310).

In one or more embodiments of the invention, the communication unit (305) may be a network processor or a network adapter that sends and receives packets by the communication link (115). For example, the communication unit (305) may receive data from the radio frequency module (315) and/or the camera module (310) and generates packets based on the received data. The communication unit (305) may send the packets to the vehicle communication unit (120, FIG. 1A) by the communication link (115). Similarly, the communication unit (305) may receive packets from the vehicle communication unit (305) by the communication link (115). The communication unit (305) may extract data from the received packets and send it to the radio frequency module (315) and/or the camera module (310).

The camera module (310) may be an electronic device configured to generate image data or a video feed of a scene exterior of the vehicle. The camera module (310) may include a circuit board including a number of traces and circuit components. For example, the camera module (310) may be a digital camera, video sensor, a CMOS imaging array, or other charge coupled device (CCD). The scene captured by the camera module (310) may be a rearward view depicting the exterior scene behind a vehicle. The scene captured by the camera module (310) may be a forward view depicting the exterior scene in front of a vehicle. The scene captured by the camera module (310) may be a side view depicting a location around that driver that would not be otherwise visible to the driver, e.g., a blind spot. The scene captured by the camera module (310) may be equivalent to that provided by a rearview mirror disposed on a windshield of a vehicle.

The camera module (310) may be configured to operate under the direction of an electronic control unit (ECU (111), FIG. 1A) of a vehicle (110, FIG. 1A). For example, the ECU may send commands to the camera module (310) that cause the camera module (310) to turn on, off, and/or generate a video feed. The camera module (310) may act as an alert sensor for the ECU and thereby cause the vehicle to take an action based on a video feed generated by the camera module (310).

When generating a video feed (and/or capturing image data), the camera module (310) may be configured to send the generated video feed (or image data) to the processors (125, FIG. 1A). The processors (125, FIG. 1A) may analyze the video feed in real-time, add annotations such as distance indicators to the video feed, and forward the video feed to the electronic control unit (111, FIG. 1A) of the vehicle (110) for display to a user.

Thus, the camera module (310) may improve the situational awareness of a user of the vehicle (110, FIG. 1A) by enabling the user to see scenes surrounding the vehicle while normally operating the vehicle that may otherwise be unavailable to the user of the vehicle (110, FIG. 1A).

The radio frequency module (315) may be an electronic device configured to send and/or receive data wirelessly. The radio frequency module (315) may be connected to the first antenna (205) by a first radio frequency feed (316) and connected to the second antenna (210) by a second radio frequency feed (317). Each feed may be a shielded connection that prevents the transmission of electromagnetic interference. The radio frequency module (315) may be configured to perform the functions shown in FIG. 9.

Returning to FIG. 3, the electronics enclosure (215) may be disposed on the bottom (201) of the housing (200, FIG. 2). The electronics housing (215) may be thermally and electrically connected to the fuselage (111, FIG. 1A) of the vehicle (110, FIG. 1A) through the bottom (201) of the housing (200, FIG. 2).

Figure 4:
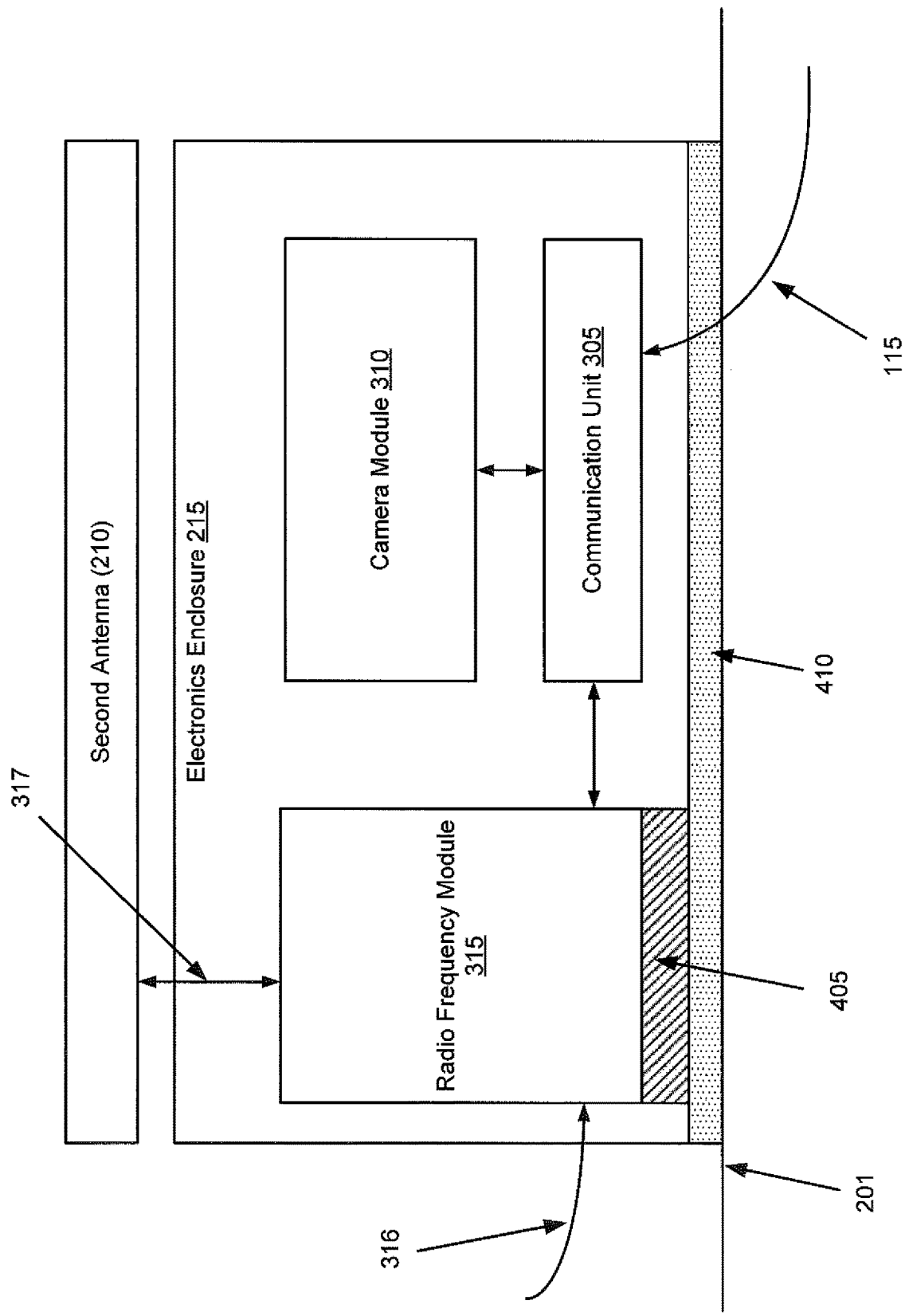
FIG. 4 shows an electronics enclosure in accordance with one or more embodiments of the invention.

In one or more embodiments of the invention, the arrangement of the radio frequency module (315), camera module (310), first antenna (205), and second antenna (210) are selected to reduce electromagnetic interference and improve cooling. FIG. 4 shows an electronics enclosure (215) in accordance with one or more embodiments of the invention.

As seen from FIG. 4, the radio frequency module (315) may be arranged in the electronics enclosure (215) adjacent to the first antenna (not shown) and second antenna (210). By arranging the radio frequency module (315) adjacent to the antennas, the first length of the first radio frequency feed (316) and second radio frequency feed (316) are minimized, which in turn minimizes electromagnetic interference caused by the first radio frequency feed (316) and second radio frequency feed (317). In one or more embodiments of the invention, the first antenna (205) and second antenna (210) may be fed directly by the radio frequency module (315).

Additionally, the radio frequency module (315) may be disposed on a face of the electronics enclosure (215) adjacent to the bottom (201) of the housing (200, FIG. 2). Arranging the radio frequency module (315) disposed on the side electronics enclosure (215) adjacent to the bottom (201) may enable conduction heat transfer to the fuselage (111, FIG. 1A) of a vehicle (110, FIG. 1A). In one or more embodiments of the invention, a first heat transfer device (405) may be disposed between the radio frequency module (315) and the electronics enclosure (215). The first heat transfer device (405) may be, for example, a layer of thermal paste, a heat pipe, or another heat transfer structure that improves heat conduction between the radio frequency module (315) and the electronics enclosure (215). In one or more embodiments of the invention, a second heat transfer device (410) may be disposed between the electronics enclosure (215) and the bottom (201). The second heat transfer device (410) may be, for example, a layer of thermal paste, heat pipe, or any other heat transfer device that may improve heat conduction between the electronics enclosure (215) and the bottom (201) of the housing (200, FIG. 2).

The camera module (310) and communication unit (305) may be arranged on a side of the electronics enclosure (215) opposite the radio frequency module (315). Arranging the communication unit (305) on a side opposite the radio frequency module (315) may prevent electromagnetic interference from being transmitted by the communication link (115).

Figure 5:
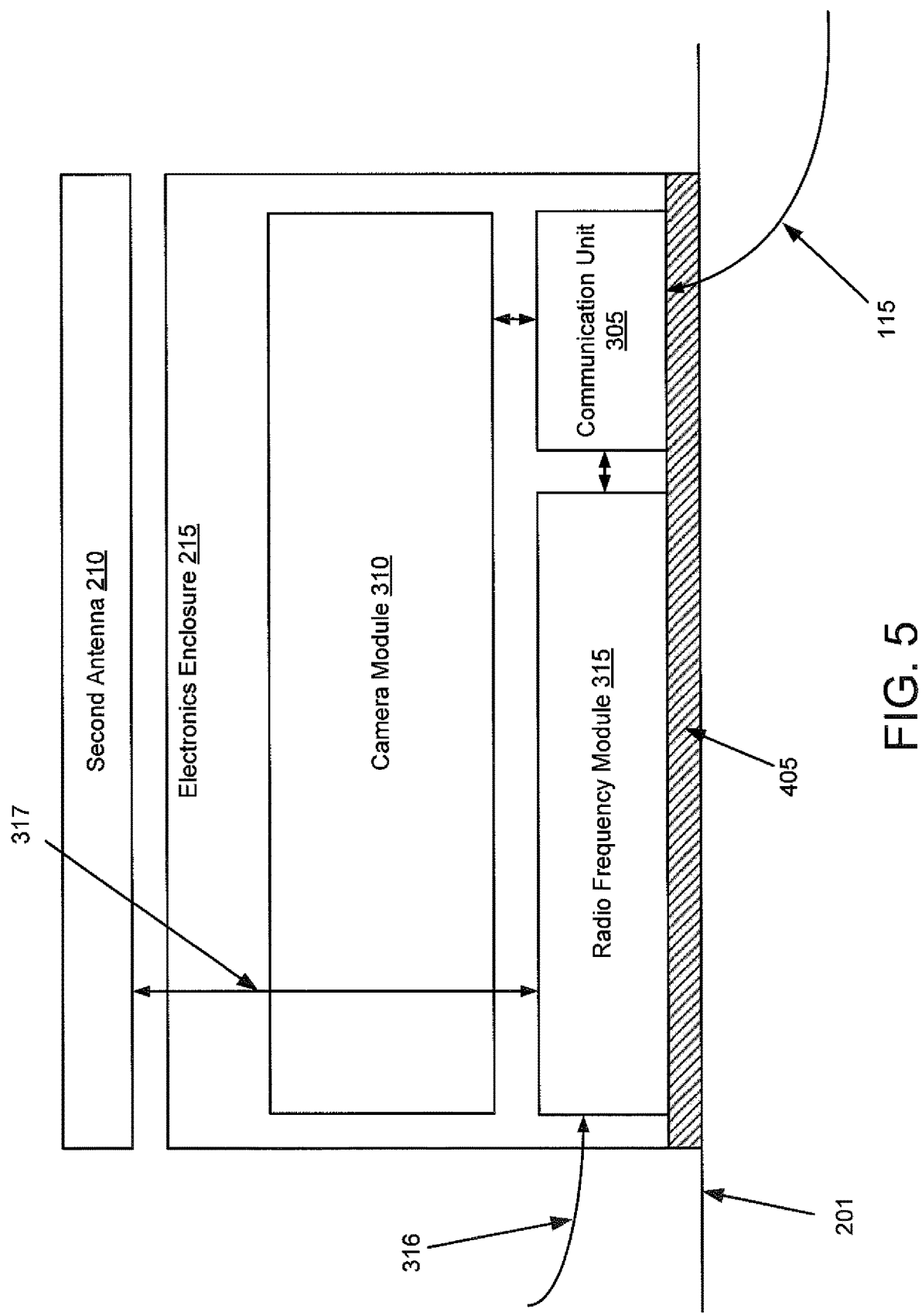
FIG. 5 shows an electronics enclosure in accordance with one or more embodiments of the invention.

FIG. 5 shows an electronics enclosure (215) in accordance with one or more embodiments of the invention. The electronic enclosure (215) of FIG. 5 houses the same components as shown in FIG. 4. However, the arrangement of the component within the electronics enclosure (215) is different than in FIG. 4.

As seen in FIG. 5, the radio frequency module (315) is disposed on the face of the electronics enclosure (215) adjacent to the bottom (201) of the housing (200, FIG. 2) and the camera module (310) is disposed between the radio frequency module (315) and the second antenna (210). In one or more embodiments, arrangement of the camera module (310) and radio frequency module (315) as shown in FIG. 5 reduces transmission of electromagnetic interference from the radio frequency module (315) to the first antenna (205, not shown) and the second antenna (210). The camera module (310) acts as a partial faraday cage for the radio frequency module (315).

Figure 6:
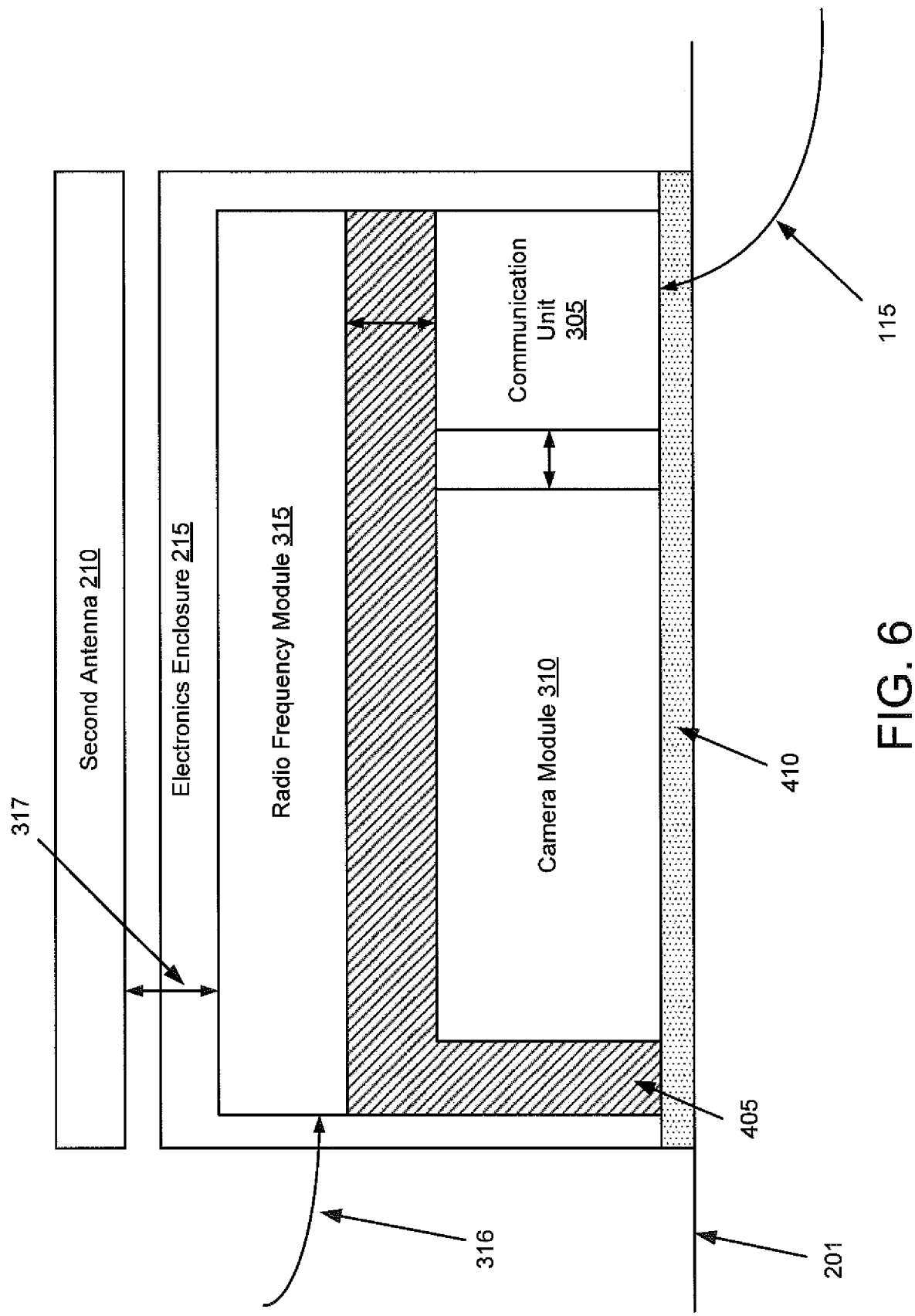
FIG. 6 shows an electronics enclosure in accordance with one or more embodiments of the invention.

FIG. 6 shows an electronics enclosure (215) in accordance with one or more embodiments of the invention. The electronic enclosure (215) of FIG. 6 houses the same components as shown in FIG. 4. However, the arrangement of the component within the electronics enclosure (215) is different than in FIG. 4.

As seen in FIG. 6, the radio frequency module (315) is disposed on the face of the electronics enclosure (215) adjacent to the second antenna (210) and the camera module (310) is disposed between the radio frequency module (315) and the bottom (201) of the housing (200, FIG. 2). In one or more embodiments of the invention, a first heat transfer device (405) may be disposed between the radio frequency module (315) and the camera module (310). The first heat transfer device (405) may be coupled to the side of the electronics enclosure (215) adjacent to the bottom (201) of the housing (200, FIG. 2). The first heat transfer device (405) may conduct heat generated by the radio frequency module (315) and/or camera module (310) to the electronics enclosure (215).

In one or more embodiments of the invention, a second heat transfer device (410) may be disposed between the electronics enclosure (215) and the bottom (201) of the housing (200, FIG. 2). The second heat transfer device (410) may conduct heat from the electronics enclosure (215) to the bottom (201) of the housing (200, FIG. 2) which in turn may be transferred to the fuselage of a vehicle for dissipation.

Thus, the arrangements shown in FIGS. 4-6 may decrease electromagnetic interference and improve heat transfer.

As described with respect to FIG. 1A, communications between components of the communication system (10, FIG. 1A) are shown in FIGS. 7A-7C. More specifically, each of FIGS. 7A-7C show embodiments of communications between components of the communication system (10, FIG. 1A).

FIG. 7A shows a communications diagram in accordance with one or more embodiments of the disclosure. More specifically, FIG. 7A shows a diagram illustrating the operative connections between components of the communication system (10, FIG. 1A).

As seen from FIG. 7A, the electronic control unit (111) of a vehicle (110) may be operatively connected to the radio frequency module (315) and camera module (310) by a communications link (115) between a vehicle communication unit (120) and a communication unit (305). The communication unit (305) may be configured to perform the functions shown in FIG. 8 to route commands or instructions received from the electronic control unit (111).

In one or more embodiments of the invention, routing of commands or instructions received from the electronic control unit (111) may be performed by the radio frequency module, as shown in FIG. 7B, or by the camera module, as shown in FIG. 7C.

As shown in FIG. 7B, the camera module (310) may be operable connected to the radio frequency module (315)

rather than the communication unit (305) as shown in FIG. 7A. When operably connected to the radio frequency module (315), all commands or instructions received from the electronic control unit (111) may be sent to the radio frequency module (315). If commands or instructions are directed to the radio frequency module (315), the radio frequency module (315) may perform the commands or instructions. If the commands or instruction are directed to the camera module (310), the radio frequency module (315) may forward the commands or instructions to the camera module (310).

As shown in FIG. 7C, the radio frequency module (315) may be operable connected to the camera module (310) rather than the communication unit (305) as shown in FIG. 7A. When operably connected to the camera module (310), all commands or instructions received from the electronic control unit (111) may be sent to the camera module (310). If commands or instructions are directed to the camera module (310), the camera module (310) may perform the commands or instructions. If the commands or instruction are directed to the radio frequency module (315), the camera module (310) may forward the commands or instructions to the radio frequency module (315).

Those skilled in the art will appreciate that the communication system (10) is not limited to the architecture shown in FIGS. 1-7.

Figure 8:
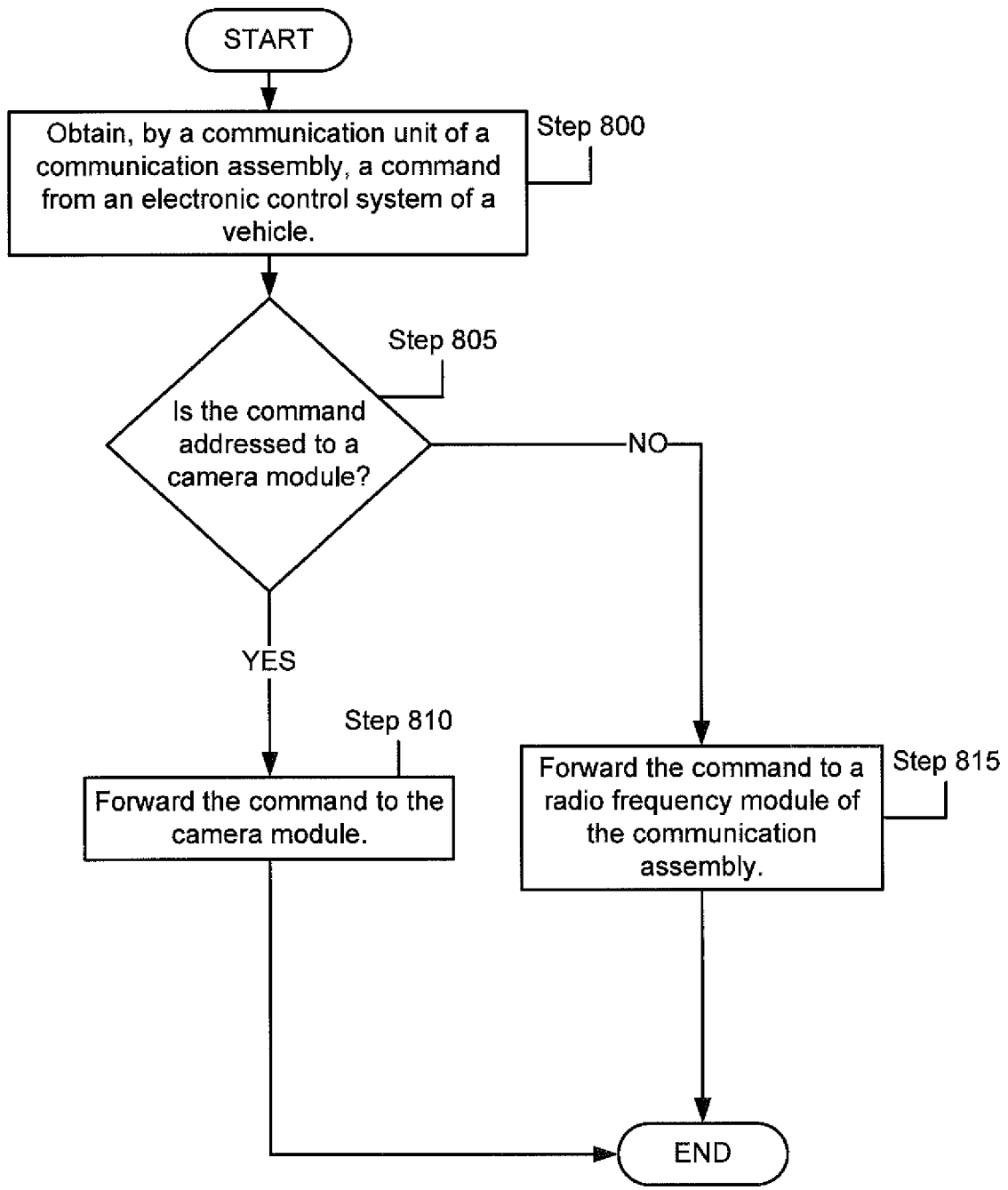
FIG. 8 shows a method of forwarding commands in accordance with one or more embodiments of the invention.
Figure 9:
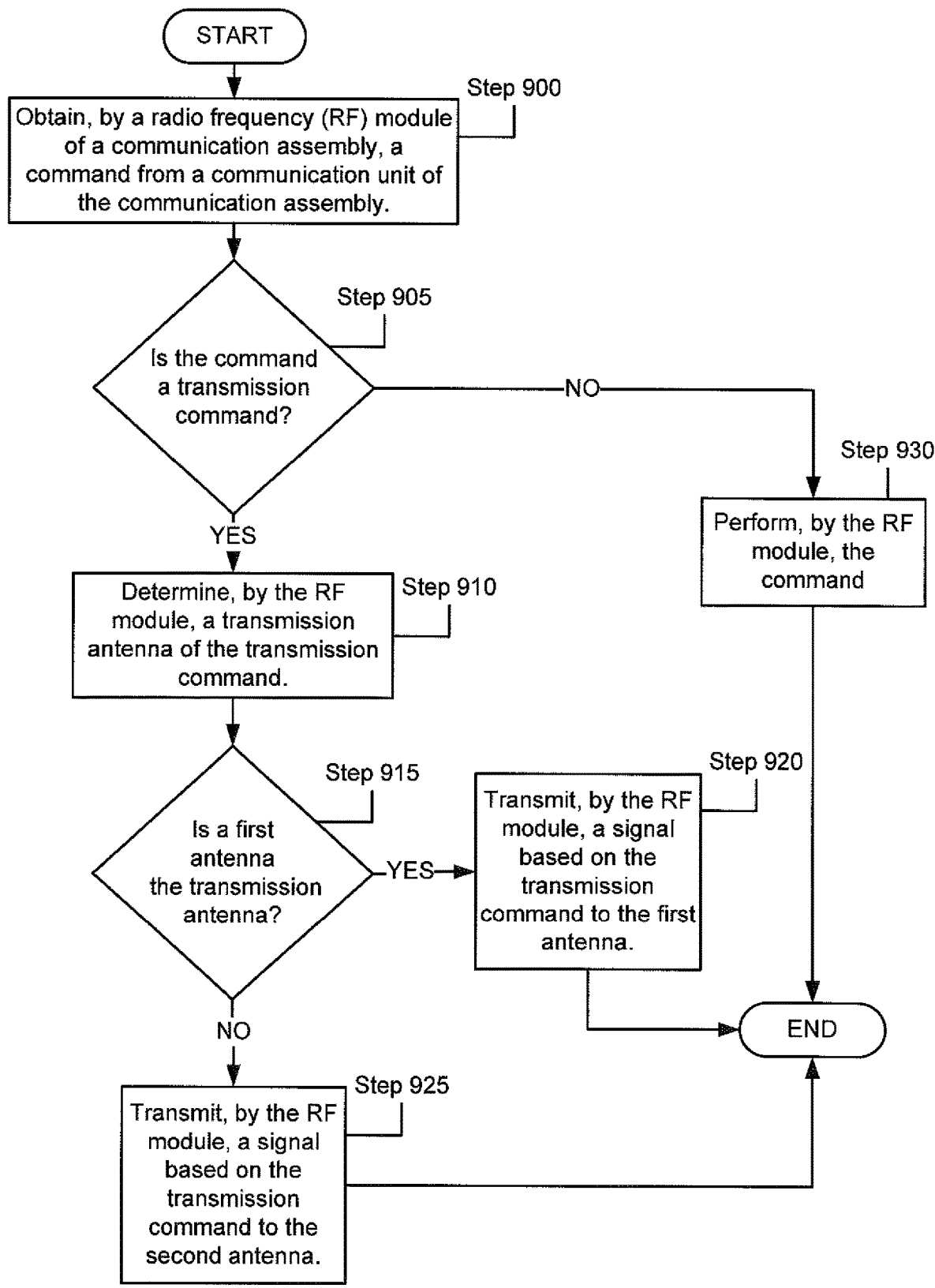
FIG. 9 shows a method of executing commands in accordance with one or more embodiments of the invention.

In the following flowcharts, functionality of components of the system shown in FIGS. 1-7 will be described. The functionality shown in the following figures may enable, for example, commands or instructions to be routed and/or processed. FIGS. 8-9 show flowcharts of methods that may be performed, for example, by a communication system.

FIG. 8 shows a flowchart according to one or more embodiments of the invention. The method depicted in FIG. 8 may be used to forward instructions received from an electronic control system of a vehicle in accordance with one or more embodiments of the invention. One or more steps shown in FIG. 8 may be omitted, repeated, and/or performed in a different order among different embodiments.

In Step 800, a communication unit of a communication assembly obtains a command from an electronic control system of a vehicle. The communication assembly may be a component of a communication system as shown in FIG. 1A. The communication unit may obtain the command by a message received from the electronic control system.

Continuing with the discussion of FIG. 8, in Step 805, the communication unit determines whether the command is addressed to a camera module of the communication assembly. The communication unit may determine whether the command is addressed to a camera based on, for example, a command type or an identifier, such as a header, included in a communication from the electronic control system.

If the command is addressed to the camera module, the method proceeds to Step 810. If the command is not addressed to the camera module, the method proceeds to Step 815.

In Step 810, the communication unit of the communication assembly forwards the command to the camera module. The method may end following Step 810.

In Step 815, the communication unit of the communication assembly forwards the command to a radio frequency module of the communication assembly. The method may end following Step 815.

Thus, the method shown in FIG. 8 may enable a communication unit to forward commands received from an electronic communication system of a vehicle to a camera module or radio frequency module of a communication assembly.

FIG. 9 shows a flowchart according to one or more embodiments of the invention. The method depicted in FIG. 9 may be used execute commands received by a radio frequency module in accordance with one or more embodiments of the invention. One or more steps shown in FIG. 9 may be omitted, repeated, and/or performed in a different order among different embodiments.

In Step 900, a radio frequency module of a communication assembly obtains a command. The radio frequency module may obtain the command from a message received from an electronic control system of a vehicle.

In Step 905, the radio frequency module determines whether the command is a transmission command. The radio frequency module may determine whether the command is a transmission command based on, for example, a command type or an identifier, such as a header, included in a communication from the electronic control system.

If the command is a transmission command, the method proceeds to Step 910. If the command is not a transmission command, the method proceeds to Step 930.

In Step 910, the radio frequency module of the communication assembly determines a transmission antenna associated with the transmission command. The radio frequency module may determine the transmission antenna based on a data type to be transmitted based on the transmission command. For example, with respect to FIG. 3, a communication assembly may include a first antenna and a second antenna that operate at different frequencies. Certain types of data may only be associated with transmission by the first antenna and other type of data may only be associated with transmission by the second antenna. Thus, a transmission antenna may be determined by the radio frequency module based on a type of data to be transmitted.

Returning to the discussion of FIG. 9, in Step 915, if the first antenna was determined as the transmission antenna in Step 910, the method proceeds to Step 920. If the second antenna was determined as the transmission antenna in Step 910, the method proceeds to Step 925.

In Step 920, the radio frequency module generates and transmits a signal to the first antenna based on the transmission command. The signal may cause the first antenna to radiate electromagnetic radiation and therein wirelessly transmit data. The method may end following Step 920.

As noted in Step 915, if the transmission antenna is the second antenna, the method proceeds to Step 925. In Step 925, the radio frequency module generates and transmits a signal to the second antenna based on the transmission command. The signal may cause the second antenna to radiate electromagnetic radiation and therein wirelessly transmit data. The method may end following Step 925.

As noted in Step 905, if the command is not a transmission command, the method proceeds to Step 930. In Step 930, the radio frequency module performs the command. The command may be, for example, to turn off the radio frequency module. The method may end following Step 930.

Thus, the method shown in FIG. 9 may enable a radio frequency module to process commands received from an electronic communication system of a vehicle.

One or more embodiments of the invention may provide one or more of the following advantages. A communication assembly in accordance with one or more embodiments of the invention may have a reduced height and/or volume. Reducing the height and/or volume of the communication assembly may reduce the total quantity of material used to form a housing of the communication assembly. The communication assembly may have a reduced number of external electrical connections by utilizing a single communication link that transmits data from a camera module and a RF module. Reducing the number of external connections may reduce the cost of the communication assembly.

A communication assembly in accordance with one or more embodiments of the invention may have few power components such as, for example, a power supply and/or may require fewer processing components such as, for example, a microcontroller. Integrating multiple electronic module in an electronics enclosure may enable redundant electrical components to be consolidated into a single component.

A communication assembly in accordance with one or more embodiments of the invention may employ less electromagnetic shielding due to the integration of a camera module and RF module into a single electronics enclosure. One module may act as an effective electromagnetic shield for the other module due to different operational frequencies of each module.

A communication assembly in accordance with one or more embodiments of the invention may utilize at least one antenna with a reduced height. Integrating two antennas into a communication assembly may enable a communications channel operating on a low frequency to be serviced by a second antenna that does not require a substantial vertical height such as, for example, a patch antenna. Integrating a second antenna may enable a first antenna, such as a monopole-type antenna, to be reduced in height by only servicing communication channels having higher operating frequencies than the communication serviced by the second antenna.

A communication assembly in accordance with one or more embodiments of the invention may have an improved ability to dissipate heat generated by electronics of the communication assembly. By disposing or thermally coupling an electronics enclosure to a fuselage of a vehicle, the communication assembly may dissipate heat by the fuselage of the vehicle.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A communication assembly, comprising:
   a first antenna;
   a housing, configured to house the first antenna and an electronics enclosure, comprising a bottom configured to be disposed on a fuselage of a vehicle; and
   the electronics enclosure comprising:
      a radio frequency (RF) module;
      a camera module; and
      a communication unit, operably connected to the RF module and the camera module, configured to communicate with a processor,
      wherein the processor:
         processes radio frequency data collected by the RF module,
         processes image data collected by the camera module,
            the processing of the radio frequency data and the image data comprising serializing the radio frequency data and the image data to obtain individual packets of processed data,
         combines the radio frequency data and the image data to form the individual packets in a single data stream in the process of serializing the radio frequency data and the image data, and
         sends, via a single communication link, the individual packets of processed data to an electronic control module (ECU) of the vehicle,
         receives, via the single communication link, a command from the ECU,
         determines whether the command is addressed to the camera module or the RF module, and
         sends, in response to the determining, the command to the camera module or the RF module,
   wherein the electronics enclosure is configured to transmit heat to the fuselage of the vehicle by the bottom of the housing.

2. The communication assembly of claim 1, wherein the electronics enclosure is disposed on the bottom of the housing.

3. The communication assembly of claim 2, wherein the RF module is disposed adjacent to the bottom of the housing.

4. The communication assembly of claim 2, wherein the camera module is disposed on the RF module.

5. The communication assembly of claim 4, wherein the camera module comprises a plurality of metallic tracks configured to prevent transmission of electromagnetic interference generated by the RF module.

6. The communication assembly of claim 2, wherein the electronics enclosure further comprises:
   a first heat transfer device disposed between the RF module and the bottom of the housing.

7. The communication assembly of claim 6, wherein the electronics enclosure further comprises:
   a second heat transfer device disposed between the electronics enclosure and the fuselage of the vehicle.

8. The communication assembly of claim 1, wherein the electronics enclosure further comprises:
   a second antenna disposed on an exterior surface of the electronics enclosure,
   wherein the RF module is operably connected to the first antenna and the second antenna,
   wherein the RF module is configured to:
      transmit a first signal to the first antenna comprising data received from a processor based a first type of the data,
      transmit a second signal to the first antenna comprising data received from a processor based a second type of the data.

9. The communication assembly of claim 1, wherein the camera module is disposed adjacent to the bottom of the housing.

10. The communication assembly of claim 9, wherein the electronics enclosure further comprises:
    a first heat transfer device disposed on the camera module.

11. The communication assembly of claim 9, wherein the RF module is disposed on the first heat transfer device.

12. The communication assembly of claim 9, wherein a second heat transfer device is disposed between the electronics enclosure and the bottom of the housing.

13. The communication assembly of claim 10, wherein the first heat transfer device is a heat pipe.

14. The communication assembly of claim 1, wherein the housing has a shape of a sharkfin.

\* \* \* \* \*